(12) United States Patent
Yin

(10) Patent No.: US 11,064,269 B2
(45) Date of Patent: Jul. 13, 2021

(54) CONVERSION METHOD, DEVICE AND STORAGE MEDIUM FOR MEDIA FILE

(71) Applicant: Beijing Bytedance Network Technology Co., Ltd., Beijing (CN)

(72) Inventor: Guohui Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 16/913,821

(22) Filed: Jun. 26, 2020

(65) Prior Publication Data

US 2020/0329283 A1 Oct. 15, 2020

Related U.S. Application Data

(63) Continuation of application No. PCT/CN2018/103581, filed on Aug. 31, 2018.

(30) Foreign Application Priority Data

May 29, 2018 (CN) .......................... 201810530467.5

(51) Int. Cl.
*H04N 21/434* (2011.01)
*H04N 21/845* (2011.01)

(52) U.S. Cl.
CPC ..... *H04N 21/8456* (2013.01); *H04N 21/4341* (2013.01)

(58) Field of Classification Search
None
See application file for complete search history.

(56) References Cited

U.S. PATENT DOCUMENTS

2008/0010658 A1* 1/2008 Abbott ............... H04N 21/2368
725/87
2009/0106288 A1* 4/2009 Yang .................. H04N 21/6377
(Continued)

FOREIGN PATENT DOCUMENTS

CN        1949876 A     4/2007
CN      102413358 A     4/2012
(Continued)

OTHER PUBLICATIONS

International Patent Application No. PCT/CN2018/103581; Int'l Search Report; dated Jan. 30, 2019; 2 pages.

*Primary Examiner* — Cai Y Chen
(74) *Attorney, Agent, or Firm* — BakerHostetler

(57) ABSTRACT

The disclosure provides a conversion method, device and storage medium for media file. The method includes: analyzing metadata encapsulated in a moov box of a media file to obtain media information for describing media data encapsulated in a mdat box of the media file; searching media data within a given time frame according to the time of the media data represented by the media information; searching the position of the media data within the given time frame in the media file according to the position of the media data represented by the media information in the media file; extracting the media data corresponding to the position from the mdat box of the media file; and encapsulating the extracted media data and the metadata for describing the media data according to the encapsulating structure of segmented media file to obtain a segmented media file capable of being independently decoded.

20 Claims, 9 Drawing Sheets

(56) References Cited

U.S. PATENT DOCUMENTS

2016/0156968 A1* 6/2016 Toma ................. H04N 21/4343
  386/248
2018/0359517 A1* 12/2018 Hasek ................ H04N 21/4622

FOREIGN PATENT DOCUMENTS

| CN | 102510519 A | 6/2012 |
| CN | 106961613 A | 7/2017 |

* cited by examiner

CONVERSION METHOD, DEVICE AND STORAGE MEDIUM FOR MEDIA FILE

CROSS-REFERENCE TO RELATED APPLICATION

The disclosure is a continuation of PCT application Ser. No. PCT/CN2018/103581, titled "CONVERSION METHOD, DEVICE AND STORAGE MEDIUM FOR MEDIA FILE", filed on Aug. 31, 2018, which claims priority to Chinese Patent Application No. 201810530467.5, filed on May 29, 2018, the entire contents of both of which are incorporated herein by reference.

TECHNICAL FIELD

The disclosure relates to a multimedia technology and in particular relates to a conversion method, device and storage medium for media file.

BACKGROUND ART

An MPEG (Moving Picture Experts Group)-4 encapsulation format (short for MP4 format herein) is a box format widely used at present and is capable of storing video data and audio data with various coding forms.

However, the MP4 encapsulation format is a non-stream media format, a file with the MP4 encapsulation format (short for MP4 file herein) cannot be played in a stream media form (namely playing while downloading), for this purpose, the MP4 file has to be converted into a stream media format such as FLU (Flash Video) and HLS (HTTP Live Streaming) in related technologies, and therefore, playing in the stream media form is realized.

However, an effective way for converting the MP4 file into a segmented media file in stream media format so as to adapt to network transmission is shorted in the related technologies.

SUMMARY

Accordingly, embodiments of the disclosure provide a conversion method, device and storage medium for media file capable of converting the media file of non-streaming media format into the segmented media file with smaller volume, which is adapted to the network transmission and decoded independently.

The purpose of the disclosure is realized by adopting the following technical solution.

A conversion method for media file provided by the disclosure, comprising: analyzing metadata encapsulated in a moov box of a media file to obtain media information for describing media data encapsulated in a mdat box of the media file, wherein the media file is expressed in non-streaming media format; searching media data within a given time frame according to the time of the media data represented by the media information; searching the position of the media data within the given time frame in the media file according to the position of the media data represented by the media information in the media file; extracting the media data corresponding to the position from the mdat box of the media file; and encapsulating the extracted media data and the metadata for describing the media data according to the encapsulating structure of segmented media file to obtain the segmented media file capable of being independently decoded.

A conversion device for media file provided by the disclosure, comprising: an analyzing module, configured to analyze metadata encapsulated in a moov box of a media file to obtain media information for describing media data encapsulated in a mdat box of the media file, wherein the media file is expressed in non-streaming media format; a searching module, configured to search media data within a given time frame according to the time of the media data represented by the media information and search the position of the media data within the given time frame in the media file according to the position of the media data represented by the media information in the media file; an extraction module, configured to extract the media data corresponding to the position from the mdat box of the media file; and a synthesis module, configured to encapsulate the extracted media data and the metadata for describing the media data according to the encapsulating structure of segmented media file to obtain a segmented media file capable of being independently decoded.

On the other hand, a conversion device for media file provided by the disclosure, comprising: a memory, configured to store executable instructions; and a processor, configured to perform the foregoing conversion method for media file according when executing the executable instructions.

On the other hand, a storage medium, storing executable instructions and being configured to perform the foregoing conversion method for media file when the executable instructions are executed.

The embodiment of the disclosure has the following technical effects:

It is capable of extracting the media data within any given time frame from the media files to construct segmented media files. Therefore, when it needs to play the media files within the given time frame, it is only necessary to extract the media data from the media files in non-streaming media format within the given time frame, and encapsulating the media data as segmented media files capable of being decoded independently. In this way, the restriction that a file with the non-streaming media format can be independently played only after being completely downloaded is overcome, and the playing real-time property is good; and meanwhile, it is only required to construct the segmented media files for the given time frame, rather than to convert the integrated media file into the stream media format in advance, the conversion delay is little, and therefore, pre-storage is not needed; and the additional storage space cannot be occupied except an original media file, so that the occupation of the storage space is remarkably reduced.

DETAILED DESCRIPTION OF THE DISCLOSURE

In order to better clarify the objective, contents and advantages of the disclosure, the disclosure will be further illustrated in detail with reference to drawings therewith. The described embodiments should not be regarded as restriction to the disclosure. All the other embodiments obtained by a person skilled in the art without creativity should be included in the protective scope of the disclosure.

Unless otherwise specified, all technical and scientific terms employed in the disclosure represent the same meaning as those accepted by a person skilled in the art. The terms therein are purely for a purpose of depicting concrete embodiments rather than limiting the disclosure.

Before further expressing the disclosure, substantives and technical terms in embodiments of the disclosure will be explained. The substantives and technical terms in the embodiments of the disclosure refer to following definitions.

(1) A media file indicates a file stores encoded media data such as at least one of audio data and video data in a manner of boxes, which likewise contains moov (aka. metadata) expressing the media information to ensure media data to be decoded correctly.

For instance, a media file formed by encapsulating MP4 box format encapsulation multimedia data with a moving picture experts group (MPEG)-4 is an MP4 file. Typically, the MP4 file stores advanced video coding (AVC), namely H.264, or video data encoded by the MPEG-4 (part 2) standard and audio data encoded by the advanced audio coding (AAC) standard. There is no doubt that other encoding modes of video and audio will not be excluded.

Figure 1:
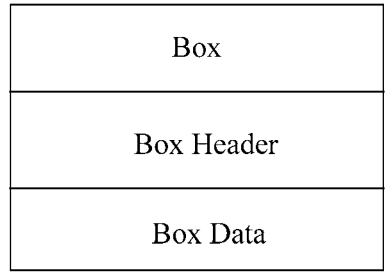
FIG. 1 is an optional structural schematic diagram of a box utilized for encapsulating multimedia files provided by an embodiment of the disclosure.

(2) A box is a component of an object oriented defined by a sole type identifier and length, referring to FIG. 1, which is an optional structural schematic view of a box provided by an embodiment of the disclosure, including a box header and box data, and binary data conveying various information filled therein.

The box header includes size and type. The size specifies the volume of the length storage space of the box occupied in the media file. The type specifies the type of the box.

Figure 2:
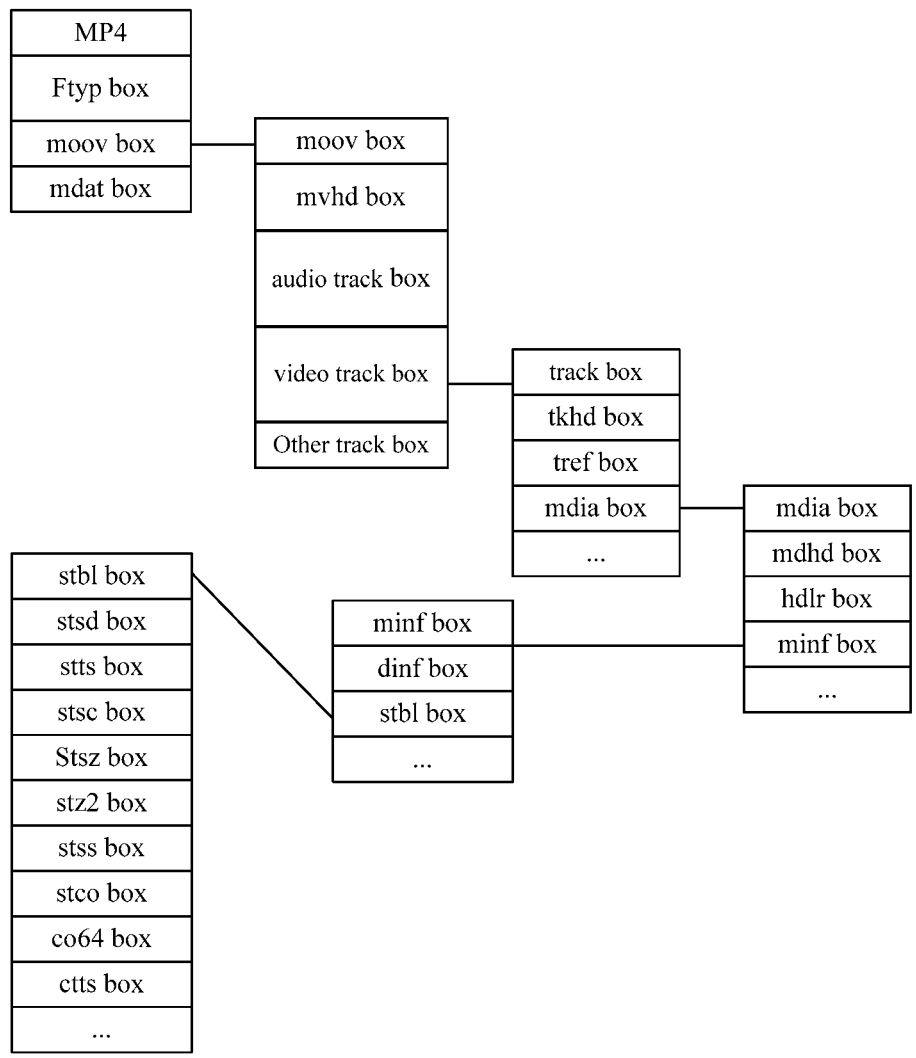
FIG. 2 is an optional schematic diagram of an encapsulation structure of an MP4 file in an embodiment of the disclosure.

Referring to FIG. 2, which is an optional schematic view of an encapsulation structure of an MP4 file in an embodiment of the disclosure. Fundamental types of boxes involved in the MP4 file contain a ftyp box, a moov box and a mdat box.

The box data section can store specific data, and the box is called a data box. The box data section can further encapsulate other types of boxes, and the boxes can be containers of boxes.

(3) A track is also named a stream, which is a relative sample arranged in chronological order in the mdat box. Regarding the media data, the track signifies a video frame sequence or an audio frame sequence, further incorporating a subtitle track synchronized with the video frame sequence. A contiguous set of samples in one track are chunks.

(4) An ftyp box is a box for storing the size, namely a length of occupied bytes, and the type of the file in the media file. As shown in FIG. 2, the binary data stored in the ftyp box describe the type and the compatibility of the file box according to the standard byte length.

(5) An moov box is a box storing moov that is data to depict multimedia data in the mdat box in the media file. Information recorded as binary data stored in the moov box in the MP4 file is called media information.

As shown in FIG. 2, a type of the box of the header of the moov box recorded as binary data is the moov box. The box data division encapsulates an mvhd box storing total information of the MP4 file, which is independent from the MP4 file, and relative to properties of the MP4 file, including duration, creation time and modification time, etc.

The mdat box of the media file can contain sub-boxes corresponding to multi-tracks, such as an audio track box and a video track box. The sub-boxes of the audio track box and the video track box include quotation and description of the media data of corresponding tracks. Necessary sub-boxes include a box describing characteristics and total information such as duration, width and height, which is labelled as a tkhd box, and a box recording media information of tracks such as media types and sampling information, which is labeled as an mdia box.

The sub-boxes encapsulated in the mdia box can include the a box recording relevant properties and contents of tracks, which is labeled as an mdhd box, a box recording playing procedure information of media, which is labeled as an hdlr box, a box describing the media information of media data in tracks, which is labeled as an minf box; the minf box further encapsulates a sub-box to interpret how to locate media information, which is labeled as a dinf box, and a sub-box for recording all the time information such as decoding time and displaying time, location information and encoding/decoding information of samples in tracks, which is labeled as an stbl box.

Figure 3:
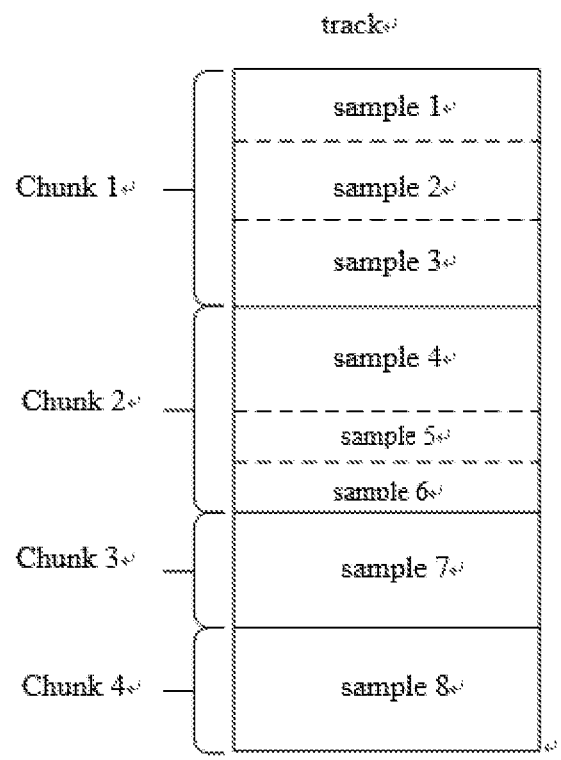
FIG. 3 is an optional structural schematic diagram of an mdat box storing media data in a media file in an embodiment of the disclosure.

Referring to FIG. 3, which is a structural schematic view of an mdat box storing media data in a media file provided by an embodiment of the disclosure. The time, type, size and location in the mdat box of samples can be explained by media information recognized from binary data in the stbl box. Each of the sub-boxes in the stbl box will be illustrated as follows.

The stsd box includes a sample description table. According to different encoding schemes and quantities of files storing data, each media file can have one or more description tables. The description information of each sample can be found through searching the description table. The description information can guarantee correctness in decoding samples. Each media type stores corresponding description information. For instance, with respect to a video medium, the description information is a structure of an image.

The stts box stores duration information of samples, as well as providing a table for mapping time such as decoding time and the sequence number of a sample. A sample at any time of the media file can be located by the stts box; the stts box further uses other tables to map the size and pointer of a sample. Each entry offers sequence numbers of successive samples in an identical time offset and the offset of samples. An intact mapping table of time-sample can be established by progressively increasing the offsets. A computational formula is as follows.

$$DT(n+1)=DT(n)+STTS(n) \qquad (1)$$

Where STTS(n) is the duration of the nth sample; DT(n) is the display time of the nth sample. An order of the samples is in accordance with the time sequence; therefore, the offset will always be nonnegative. Generally, DT beginning from 0, and taking the display time of an $i^{th}$ sample as an example, the computational formula is as follows.

$$DT(i)=\text{SUM(for } j=0 \text{ to } i-1 \text{ of delta}(j)) \qquad (2)$$

The sum of all offsets is the duration of the media data in tracks.

An stss (Time-To-Sample Atoms) box records sequence numbers of key frames in the media file.

A stsc (Sample-To-Chunk Atom) box records a mapping relation between samples and chunks storing the samples. The table maps the relation between the sequence numbers of samples and those of chunks. The chunk containing a specific sample can be determined by searching the table.

A stco box defines the location of each chunk in tracks. The location is represented by the offset of an initial byte of the mdat box and a length corresponding to the initial byte, namely a size.

A stsz (Sample Size Atom) box records a volume/size of each sample in the media file.

(6) An mdat box is a box for storing multimedia data in the media file. For instance, an mdat box in an MP4 file, as shown in FIG. 3, a sample is a unit stored in the mdat box. In a chunk stored in the media file, lengths of chunks and those of samples can be mutually be different.

(7) A segmented media file is a sub-file formed by dividing the media file. Each segmented media file can be decoded independently.

Taking the MP4 file as an example, the media data in the MP4 file is divided according to the key frames. The divided media data and corresponding moov are encapsulated to form a segmented MP4 (FMP4) file. The moov in each FMP4 file can ensure the media data to be decoded correctly.

Figure 4:
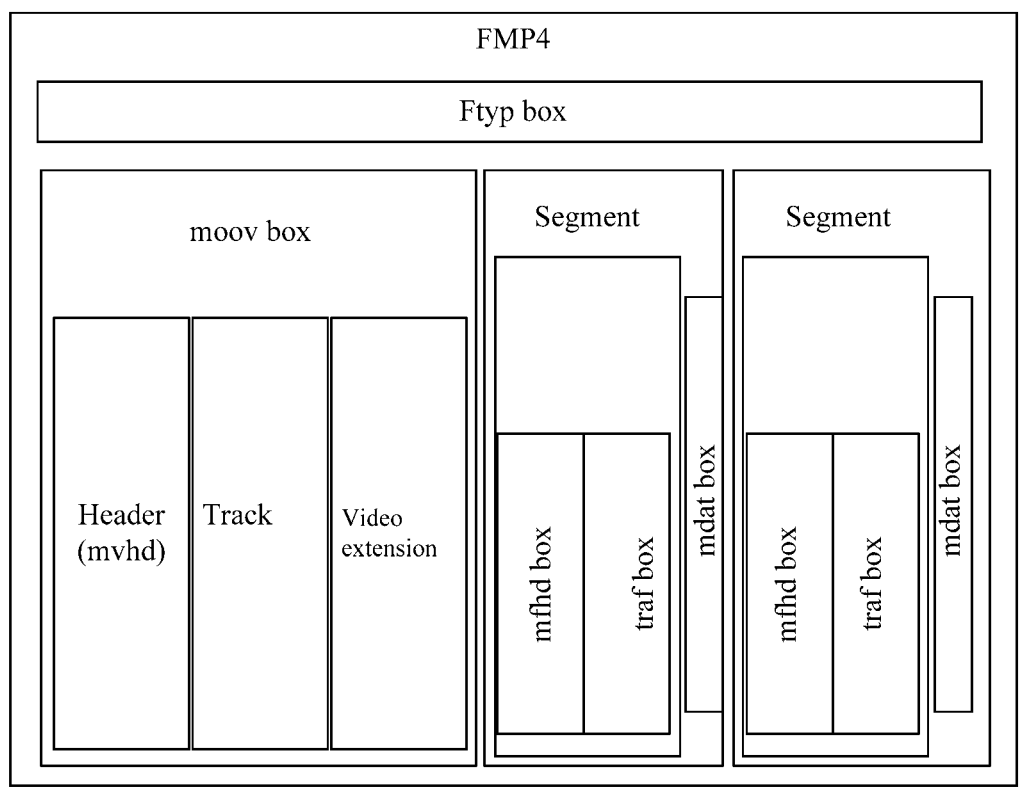
FIG. 4 is an optional schematic diagram of an encapsulation structure of an FMP4 file in an embodiment of the disclosure.

For instance, when the MP4 file as shown in FIG. 2 is converted to multiple FMP4 files, referring to FIG. 4, which is an optional schematic view of an encapsulation structure of an FMP4 file provided by an embodiment of the disclosure. One MP4 file can be converted to be multiple FMP4 files. Each FMP4 file includes three basic boxes: an moov box, an moof box and an mdat box.

The moov box includes the MP4-leveled moov, which is used for describing all media data of the MP4 file that the FMP4 files derived from, such as the duration, creation time and modification time of the MP4 file.

The moof box stores the segmented moov, which describes media data encapsulated in the FMP4 file therein to ensure the media data in the FMP4 file to be able to be decoded.

One moof box and one mdat box constitutes one segment of the segmented MP4 file. One segmented MP4 file can include one or more segments. The moov encapsulated in each segment guarantees media data encapsulated in segments to be decoded independently.

(8) A media source extensions (MSE) interface is an interface orienting players embedded in the network, which is interpreted by an interpreter during loading a webpage and achieved by running the frontend programming language such as JavaScript, with a function of providing playing media stream of the media element invoking Hyper Text Markup Language (HTML) to players, such as utilizing the video element and the audio element to perform functions of the video/audio.

(9) A streaming media encapsulation format streaming media format is a media file encapsulating media data to be streaming media. The media file is unnecessary to be completely downloaded or additionally transcoded for being decoded and played. In other words, the encapsulation technology originally supports downing and playing at the same time. A typical file of the streaming media encapsulation format streaming media format includes a TS media file segmentation based on the HTTP Live Streaming (HLS) technique, flash video (FLV) and so on.

(10) A non-streaming media encapsulation format streaming media format is an encapsulation technology of decoding and playing after encapsulating media data to be a media file and completely downing the media file. A typical file of the non-streaming media encapsulation format streaming media format includes an MP4 file, a windows media video (WMV) file, an advanced streaming format (ASF) file and so on.

It is necessary to point out that the MP4 file originally fails to play in a form of streaming media, but the technical effect of downing and playing at the same time can be acquired by online transcoding and subsequently delivering the transcoded streaming media to the player, or filling invalid binary data into the blank section of the incompletely downloaded MP4 file such as filling a blank section of an mdat box with invalid binary data when an ftyp box and an moov box are entirely downloaded. In the disclosure, encapsulation formats reject files of playing streaming media originally are defined to be non-streaming media formats.

First, a conversion device for media file of an embodiment of the disclosure will be introduced. The conversion device for media file can be provided as hardware, software or a combination of hardware and software.

Figure 5:
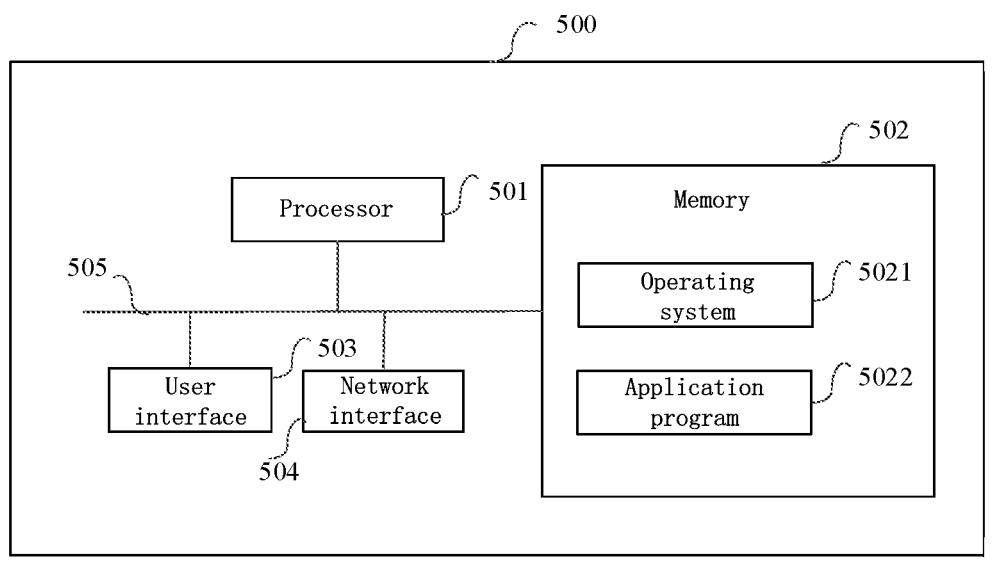
FIG. 5 is an optional structural schematic diagram of a conversion device for media file provided by the embodiment of the disclosure.

An embodiment of the combination of hardware and software of the conversion device for media file will be illustrated as follows. Referring to FIG. 5, FIG. 5 is an optional schematic view of a conversion device for media file in an embodiment of the disclosure. A conversion device for media file 500 can be a mobile phone, a computer, a digital broadcasting terminal, a message transmitter-receiver, a game controller, a tablet, a medical facility, a fitness facility, a personal digital assistant with the function of playing videos and so on. The conversion device for media file 500 as shown in FIG. 5 includes at least one processor 501, a memory 502, at least one network interface 504 and a user interface 503. Various components in the conversion device for media file 500 are coupled together by a bus system 505. Conceivably, the bus system 505 is utilized to connect and communicate the components. Besides the bus, the bus system 505 further includes a power bus, a control bus and a status signal bus. But for the sake of clear illustration, all sorts of buses in FIG. 5 are marked as the bus system 505.

The user interface 503 can include a display, a keyboard, a mouse, a trackball, a click wheel, a key, a button, a touch panel or a touch screen.

Conceivably, the memory 502 can be a volatile memory or a nonvolatile memory, or both. The nonvolatile memory can be a read only memory (ROM), a programmable read-only memory (PROM), an erasable programmable read-only memory (EPROM), an electrically erasable programmable read-only memory (EEPROM); magnetic memory can be a disk memory or a tape memory. The volatile memory can be a random access memory (RAM), which is used as an external cache. The illustration is exemplary, rather than limitation. Many forms of RAMs are available, such as a static random access memory (SRAM), a synchronous static random access memory (SSRAM), a dynamic random access memory (DRAM), a synchronous dynamic random access memory (SDRAM). The memory 502 provided in embodiments of the disclosure is aimed at including aforementioned and other suitable memories.

The memory 502 in an embodiment of the disclosure includes but not limited to a ternary content-addressable memory (TCAM), a static random access memory, which can store media file data obtained from a server to support the operation of the conversion device for media file 500. Examples of the data include any computer program run over the conversion device for media file 500, such as an operating system 5021, an application program 5022, and various types of media file data information. The operating system 5021 includes a variety of system programs, such as a frame layer, a core library layer, a driver layer, configured for supporting various basic services and handling missions based on hardware. The application program 5022 can include all sorts of application programs, such as a client or an application program with the conversion function of the media file. Programs with conversion method of the media file in embodiments of the disclosure can be included in the application program 5022.

Methods disclosed by embodiments of the disclosure are acquired by the processor 501. The processor 501 can be an integrated circuit chip with abilities to process signals. During the process, the conversion methods of the media file provided by embodiments of the disclosure can be fulfilled by an integrated logic circuit of hardware or manipulation of software in the processor 501. The processor 501 can be a communication processor, a digital signal processor (DSP), or other programmable logic devices, a discrete gate or a transistor logic device, a discrete hardware component, etc. The processor 501 can implement or perform all methods, steps and logic diagrams provided in embodiments of the disclosure. The communication processor can be a microprocessor or any other conventional processor. Combined with steps of methods provided of embodiments of the disclosure, the result can be processed by hardware decoding processors or mixture of hardware and software in decoding processors. Software modules can be located in a storage medium. The storage medium locates in the memory 502. The processor 501 reads information in the memory 502, and runs the conversion methods of the media file with the aid of hardware.

In an exemplary embodiment, an embodiment of the disclosure further provides a computer-readable storage medium, including the memory 502 of a computer program. The aforementioned computer program can be processed by the processor 501 of the conversion device 500 of the media file to run the conversion methods of the media file. The computer-readable storage medium can be a memory such as an FRAM, an ROM, a PROM, an EPROM, an EEPROM, a flash memory, a magic memory, a compact disc, or a CD-ROM; or a device including one or more memories above, such as a mobile phone, a computer, a tablet, a personal digital assistant, etc.

The hardware achievement of the conversion device for media file will be illustrated below. The conversion device for media file in embodiments of the disclosure can be fulfilled by one or more application specific integrated circuit (ASIC), DSP, programmable logic device (PLD), complex programmable logic device (CPLD), field-programmable gate array (FPGA) or other electrical elements, configured for performing the conversion methods of the media file provided by embodiments of the disclosure.

The software achievement of the conversion device for media file will be illustrated below. The conversion device for media file in embodiments of the disclosure can be fulfilled by application programs or plug-ins, or a combination of both.

As an example, an application program can be a client specific for converting the media file, or a client with an optical service of the conversion function of the media file, which will be activated by installing a corresponding plug-in.

As an example, the plug-in can upgrade installation package for application programs and add the conversion function of the media file in the application programs of media players; or the plug-in can be an element in a webpage of media players, which can be achieved by the frontend language and directly performed by the browser to analyze the media file and play the media in the webpage.

Figure 6:
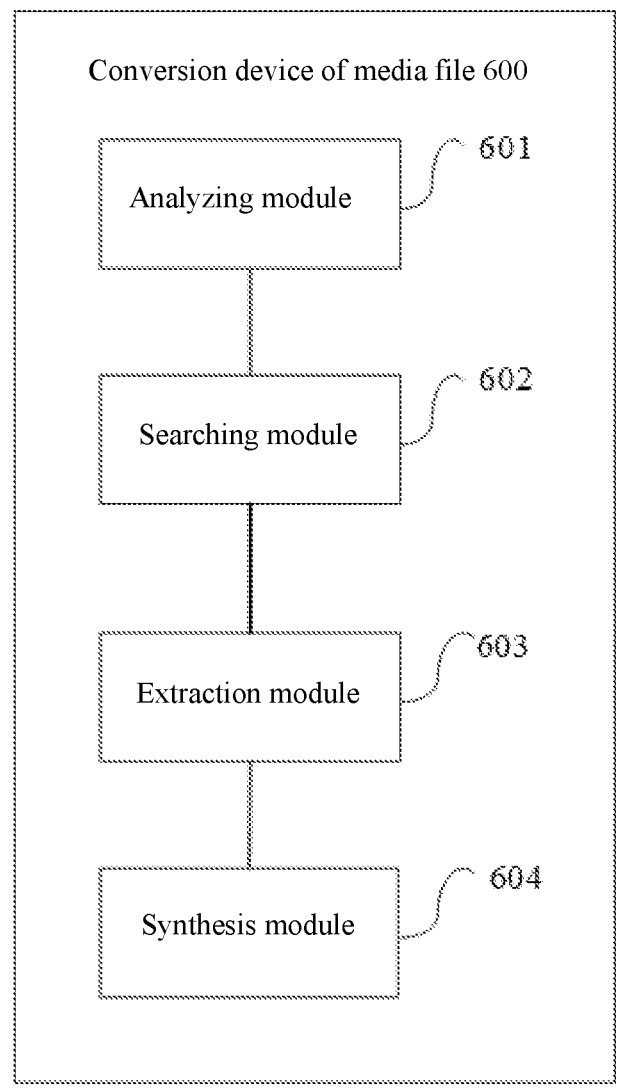
FIG. 6 is an optional structural schematic diagram of another conversion device for media file provided by the embodiment of the disclosure.

As an example of hardware achievement or software achievement of the conversion device for media file, the conversion device for media file can provide a series of modules coupled in signals/information/data, which will be illustrated with reference to FIG. 6. Referring to FIG. 6, FIG. 6 is an optional structural schematic view of a conversion device of an media file of an embodiment of the disclosure, which shows a series of modules included in the conversion device for media file, but the module structure of the conversion device for media file is unlimited to that shown in FIG. 6. For instance, modules therein can be further separated or combined according to different functions. The following is the illustration of functions of modules shown in FIG. 6.

Illustration on functions of each module shown in FIG. 6 will be continuously based on FIG. 5 as below.

An analyzing module 601 is configured to analyze metadata encapsulated in a moov box of a media file to obtain media information for describing media data encapsulated in a mdat box of the media file, wherein the media file is expressed in non-streaming media format.

In one embodiment of the disclosure, the analyzing module 601 is configured to analyze nested structures of sub-boxes in the moov box and read binary data in each sub-box according to the nested structures; and the analyzing module 601 is configured to analyze the media information of the media data represented by each sub-box from the read binary data. In combination with a structure as shown in FIG. 2, the box may be of the nested structure, and therefore, the nested structures of the sub-boxes in the moov box are firstly analyzed, and the corresponding binary data is analyzed from a mdat box. Due to the adoption of the technical solution as shown in the embodiment, the analyzing of the moov box with the nested structure and the acquisition of related data can be realized.

A searching module 602 is configured to search media data within a given time frame according to the time of the media data represented by the media information.

In one embodiment of the disclosure, the searching module 602 is configured to search two key frames in the media file according to the time of the media data, wherein the two key frames correspond to the starting time and ending time of the given time frame; the searching module 602 is configured to search audio frames aligned to video frames between the two key frames according to the time of the media data; and the searching module 602 is configured to search the positions of the video frames between the two key frames in the media file and the positions of the audio frames in the media file according to the position of the media data. Due to the adoption of the technical solution as shown in the embodiment, the determination of the video frames in the nested structures and the determination of the positions of the corresponding audio frames in an audio track box can be realized in combination with the structure as shown in FIG. 2.

The searching module 602 is configured to search the position of the media data within the given time frame in the media file according to the position of the media data represented by the media information in the media file.

In one embodiment of the disclosure, the searching module 602 is further configured to search a first key frame of which the decoding time is aligned to the starting time of the given time frame according to the time of the media data; the searching module 602 is further configured to search a first key frame of which the decoding time is closest to the starting time from key frames of which the decoding time is prior to the starting time of the given time frame; the searching module 602 is further configured to search a second key frame of which the decoding time is aligned to the ending time of the given time frame according to the time of the media data; and the searching module 602 is further configured to search a second key frame of which the decoding time is closest to the ending time from key frames of which the decoding time is posterior to the ending time of the given time frame.

In one embodiment of the disclosure, the searching module 602 is further configured to search the audio frames of which the decoding time is within the given time frame according to the time of the media data;

the decoding time of a last audio frame is aligned to the ending time of the given time frame or is posterior and closest to the ending time of the given time frame. Due to the adoption of the technical solution as shown in the embodiment, the audio frames of which the decoding time is within the given time frame may be searched according to the time of the media data, the decoding time of the initial audio frame is aligned to the starting time of the given time frame or is prior and closest to the starting time of the given time frame, and therefore, the formed segmented media files overcomes the problem of video and audio duration inconsistency possibly appearing in the MP4 file, guarantees the synchronous audio playing during playing of each frame of video, and avoids the phenomenon of no sounds and improve the use experience of a user.

An extraction module 603 is configured to extract the media data corresponding to the position from the mdat box of the media file.

In one embodiment of the disclosure, the extraction module 603 is configured to determine an interval formed by the minimum offset and the maximum volume according to offsets and volumes corresponding to the positions of the video frames between the two key frames and offsets and volumes corresponding to the positions of the audio frames aligned to the video frames; and the extraction module 603 is configured to extract the media data within the given time frame from the corresponding interval of the mdat box of the media file. Due to the adoption of the technical solution as shown in the embodiment, the interval formed by the minimum offset and the maximum volume is determined, and the media data is extracted from the corresponding interval of the mdat box of the media file, so that secondary extraction for the media data is avoided, and the processing efficiency of the media data is effectively increased.

In one embodiment of the disclosure, the offsets represent the storage starting position of the media data in the mdat box of the media file, and the volumes represent lengths of the media data started from the storage starting position.

In one embodiment of the disclosure, the extraction module 603 is configured to extract the video frames according to the storage positions of the video frames and extract the audio frames according to the storage positions of the audio frames after completing the extraction of the video frames.

In one embodiment of the disclosure, the extraction module 603 is configured to extract the video frames and the audio frames from the media data according to a preset extraction value. Due to the adoption of the technical solution as shown in the embodiment, the corresponding audio frames and video frames can be obtained by one-time extraction, so that the processing speed of the media file is increased.

A synthesis module 604 is configured to encapsulate the extracted media data and the metadata for describing the media data according to an encapsulating structure of segmented media file to obtain a segmented media file capable of being independently decoded.

In one embodiment of the disclosure, the synthesis module 604 is configured to perform filling operation on data representing the type and compatibility of the media file so as to fill the data into a ftyp box of the segmented media files; the synthesis module 604 is configured to fill metadata representing the file level of the media file into a moov box of the segmented media files; and the synthesis module 604 is configured to respectively fill the extracted media data and the metadata for describing the media data into a mdat box in a segment box of the segmented media files and a moov box of segment level. In combination with a structure as shown in FIG. 4, the synthesis module 604 is configured to fill the data representing the type and compatibility of the media file into a moov box, fill the metadata representing the file level of the media file into a moof box and fill the extracted media data and the metadata for describing the media data into a mdat box. Due to the adoption of the technical solution as shown in the embodiment, the entire segmented media file capable of being independently decoded can be obtained by encapsulating and filling the media data.

In one embodiment of the disclosure, the synthesis module 604 is further configured to call a writing operation function of a class in a device corresponding to the sub-boxes of the segmented media files so as to complete the mergence of the sub-boxes and sub-boxes among which a nesting relationship exists.

In one embodiment of the disclosure, the synthesis module 604 is further configured to call the writing operation function of the class to complete the writing-in and mergence of the binary data in memory buffering zones of the sub-boxes and return an instance of the class, wherein the returned instance is used for merging the sub-boxes and the sub-boxes among which the nesting relationship exists.

In one embodiment of the disclosure, the synthesis module 604 is further configured to provide a memory buffering zone through the class Stream, and the memory buffering zone is used for storing the written-in binary data; to-be-filled multibyte decimal data is converted into the binary data by using a static method provided by the Stream; the mergence of the binary data to be filled into the sub-boxes is completed in the memory buffering zone through the writing operation function provided by the instance of each class Stream; and a new Stream instance is returned by using the method, due to the adoption of the technical solution as shown in the embodiment, the mergence of the current sub-boxes and other sub-boxes among which the nesting relationship exists can be realized, so that the sub-boxes can be flexibly regulated.

In one embodiment of the disclosure, requesting the metadata of the media file is also included prior to analyzing the metadata encapsulated in the moov box of the media file, when the metadata of a media file with original resolution or a media file with target resolution are requested, firstly, whether a requested cache has been requested is checked, if so, the media data is further requested, and the metadata is not repeatedly requested; and due to the adoption of the technical solution as shown in the embodiment, the media data which has been requested can be utilized, so that the data acquisition time is shortened, and the operation speed is increased.

In one embodiment of the disclosure, the synthesis module 604 is further configured to acquire the binary data corresponding to the moov box from the binary data of the media file according to the position of the moov box in the media file; the synthesis module 604 is further configured to sequentially analyze the binary data corresponding to a standard length of box header of the moov box in the acquired binary data to obtain box types of the sub-boxes in the moov box and the lengths of the box data of the sub-boxes; and the synthesis module 604 is further configured to call analyzers belonging to types corresponding to the box types of the sub-boxes to sequentially analyze the binary data corresponding to the lengths of the box data in the unanalyzed data to obtain the media information represented by the box data.

In one embodiment of the disclosure, a process that a player acquires the media data within the given time frame is described. When a video file or a media file of a track is played by a player embedded in a webpage, the player needs to correctly analyze a data flow, acquire the corresponding media data within a certain time and ensure that the segments of media data can be independently decoded.

A conversion method for media file provided by the embodiment of the disclosure will be described in combination with the conversion device for media file provided by the embodiment of the disclosure, the MP4 file serving as a media file is described as an example below, it should be understood that an MP4 file conversion scheme recorded according to downloads can be easily applied to other non-streaming media formats such as MKV, WMV and ASF.

Figure 7:
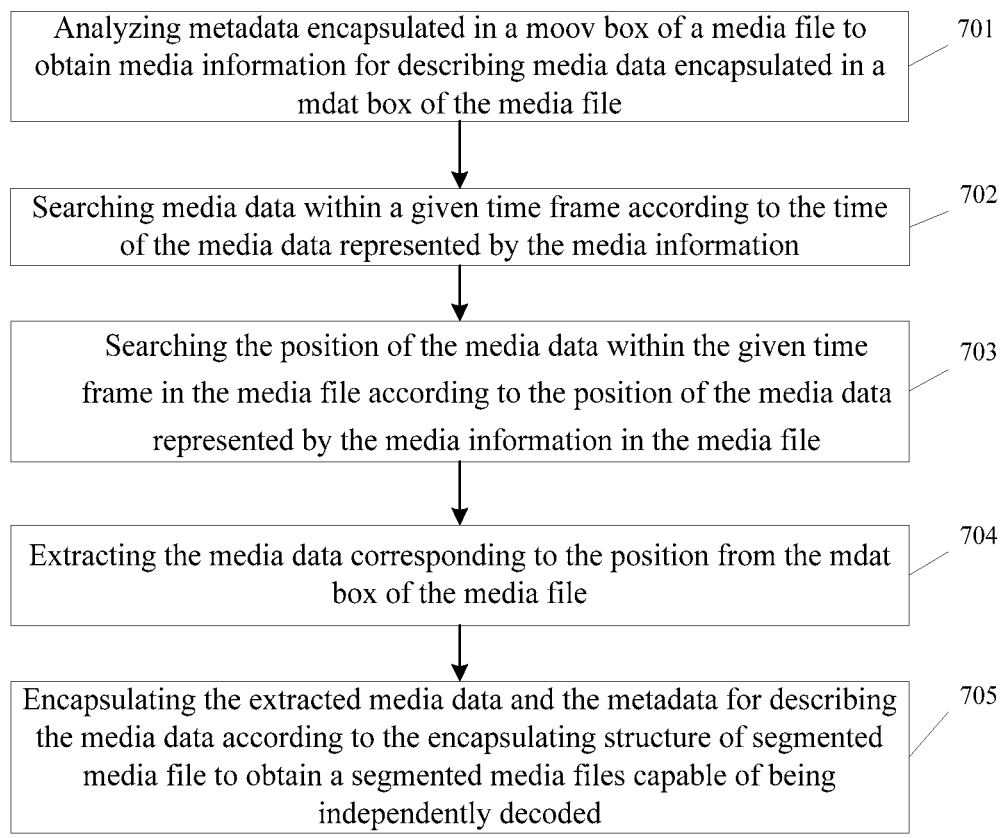
FIG. 7 is an optional flow schematic diagram of a conversion method for media file provided by the embodiment of the disclosure.

Referring to FIG. 7, FIG. 7 is an optional flow schematic diagram of a conversion method for media file provided by the embodiment of the disclosure and will be described in combination with steps as shown in FIG. 7.

Step 701, metadata encapsulated in a moov box of a media file is analyzed to obtain media information for describing media data encapsulated in a mdat box of the media file.

In one embodiment of the disclosure, the media file is the MP4 file, nested structures of sub-boxes in the moov box of the media file are analyzed, and binary data in each sub-box is read according to the nested structures; and the media information of the media data represented by each sub-box is analyzed from the read binary data.

In combination with the structure as shown in FIG. 2, the moov box of the MP4 file is of the nested structure, the nested structures of the sub-boxes in the moov box are analyzed to determine the sub-boxes such as a mvhd box, an audio track box and a video track box nested in the moov box, if there exist boxes nested in the sub-boxes, the sub-boxes are further analyzed until the sub-boxes in which no boxes are nested are analyzed, and the binary data encapsulated in the corresponding sub-boxes is read and analyzed to obtain the media information represented by the binary data, such as serial numbers of key frames in the media file recorded by a stss box and the volume (namely size) of each sample in the media file recorded by a stsz box.

In one embodiment of the disclosure, ways of arranging the analyzers according to box types and analyzing the sub-boxes in the moov box according to the box types so as to obtain the media information will be described in combination with FIG. 8.

Figure 8:
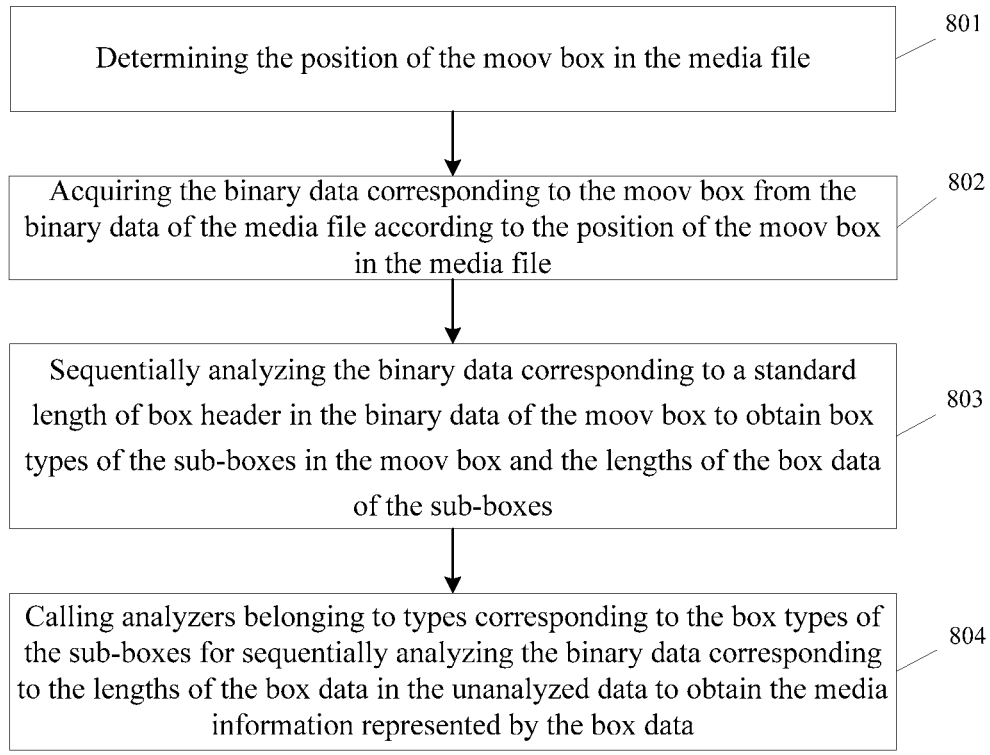
FIG. 8 is an optional flow schematic diagram of analyzing a moov box to obtain media information in the embodiment of the disclosure.

Referring to FIG. 8, FIG. 8 is an optional flow schematic diagram of analyzing a moov box to obtain media information in the embodiment of the disclosure and will be described in combination with steps as shown in FIG. 8.

Step 801: the position of the moov box in the media file is determined.

In one embodiment of the disclosure, the binary data conforming to the standard of the box header is read from the binary data of the media file, and the offsets and volumes of the moov box in the media file are determined according to the types and lengths of the boxes identified in the read binary data.

For example, for the binary data of the media file, the binary data starting from a zero byte corresponds to the ftyp box, the starting position of the binary data of the media file is read according to the standard length of the box header, the binary data conforming to the standard length of the box header is read, the obtained binary data is analyzed, and thus, the types and lengths of boxes behind the ftyp box in the media file can be determined.

If the analyzed type is the ftyp box, the length (namely volume) of the moov box may be analyzed, and at the moment, the offset of the moov box is the length of the ftyp box.

If the analyzed type is the mdat box, the binary data conforming to the standard length of the box header is further read by taking the length of the mdat box and the length of the ftyp box as the offsets, so that the length (namely volume) of the moov box can be analyzed, and at the moment, the length of the moov box is the sum of the length of the ftyp box and the length of the mdat box.

The encapsulation order of the subsequent boxes is not standardized except that the initial box is the ftyp box in the media file, and due to the adoption of the above-mentioned analyzing way, the position of the ftyp box in the media file can be accurately and efficiently determined no matter the encapsulation order of the boxes in the media file is the ftyp box, the moov box and the mdat box or the ftyp box, the mdat box and the moov box.

Step 802, the binary data corresponding to the moov box is acquired from the binary data of the media file according to the position of the moov box in the media file.

The position of the moov box in the media file is represented by the offsets and the volumes, and the binary data read from the position corresponding to the offsets is read from the media file until the length of the read binary data conforms to the volume of the moov box, so that the binary data corresponding to the moov box is read.

Step 803, the binary data corresponding to a standard length of the box header in the binary data of the moov box is sequentially analyzed to obtain the box types of the sub-boxes in the moov box and the lengths of the box data of the sub-boxes.

In one embodiment, for the situation that the plurality of sub-boxes are nested in the moov box, the offset of the binary data read every time is the sum of the lengths of the sub-boxes which have been identified, and the length of the read binary data conforms to the standard length of the box header, so that the types and lengths of the sub-boxes processed at present can be analyzed.

For example, during first reading, the binary data is read from the zero byte of the binary data of the moov box, and the length of the read binary data conforms to the standard length of the box header, so that the type and length of the first sub-box can be analyzed; during second reading, the binary data is read by taking the firstly read length of the sub-box as the offset, and the length of the read binary data conforms to the standard length of the box header, so that the type and length of the second sub-box can be analyzed.

If the binary data is read in the above-mentioned way, both the condition of backspacing caused by excessive reading and the condition of secondary reading caused by insufficient reading can be avoided, so that the analyzing efficiency and accuracy are guaranteed.

Step 804, analyzers belonging to types corresponding to the box types of the sub-boxes are called for sequentially analyzing the binary data corresponding to the lengths of the box data in the unanalyzed data, so that the media information represented by the box data is obtained.

In one embodiment, the types of typical boxes nested in the moov box are pre-marked for showing that the boxes are directly used for encapsulating the binary data or further encapsulating boxes, for example, a mvhd box, an audio track box, a video track box and the like as shown in FIG. 2 are marked to further encapsulate boxes, and a stts box, a stsd box and the like as shown in FIG. 2 are marked to further encapsulate the binary data.

For the box types marked to directly encapsulate the binary data, analyzers in one-to-one correspondence to the box types are arranged, and the analyzers are used for analyzing the represented media information according to the binary data; in step 804, when the box types of the sub-boxes, analyzed in step 803, are compared with the pre-marked box types, the following two situations are involved.

Situation 1) when it is determined by comparison that the box types of the sub-boxes are pre-marked and are pre-marked to be directly used for encapsulating the binary data, the analyzers corresponding to the box types of the sub-boxes are called, and the box data in the sub-boxes is analyzed by the analyzers, so that the media information represented by the box data is obtained.

Situation 2) when it is determined by comparison that the box types of the sub-boxes are pre-marked and are pre-marked to be used for further encapsulating boxes, the binary data corresponding to the sub-boxes is recursively analyzed according to the standard length of the box header in the media file until the box types of the boxes encapsulated in the sub-boxes are analyzed to be pre-marked and are pre-marked to be used for directly encapsulating the binary data, the analyzers corresponding to the box types of the boxes encapsulated in the sub-boxes are called, the binary data is analyzed byte by byte, and the length of the analyzed binary data corresponds to the length of the box data of the boxes encapsulated in the sub-boxes, so that the media information represented by the box data of the boxes encapsulated in the sub-boxes is obtained.

In one embodiment, a way of recording the media information in a process of analyzing the moov box is described, when the binary data corresponding to the standard length of the box header in the binary data of the moov box is sequentially analyzed to obtain the box types of the sub-boxes in the moov box, objects are established according a nesting relationship between each of the sub-boxes and the boxes to which the sub-boxes belong and a nesting relationship between the sub-boxes and the boxes encapsulated in the sub-boxes, when the box types of the sub-boxes are pre-marked to be used for directly encapsulating the binary data, arrays including the media information are stored in the objects established corresponding to the sub-boxes, and the stored media information is represented by the box data of the sub-boxes.

For example, in FIG. 2, when the type of the analyzed sub-box is the stts box, since the stts box is pre-marked to directly encapsulate the binary data, the arrays including the media information are stored in the object established corresponding to the stts box, and the media information herein is duration information represented by the box data of the stts box.

In one embodiment, a way of recording a nesting relationship among the sub-boxes in a process of analyzing the moov box is described, when the binary data corresponding to the standard length of the box header in the binary data of the moov box is sequentially analyzed to obtain the box types of the sub-boxes in the moov box, if the box type is pre-marked to directly encapsulate the binary data, the analyzed sub-box is recorded in the called analyzer; and an example of the recorded sub-box is arranged in a sub-box attribute, the sub-box attribute includes the box to which the sub-box belongs and is used for describing the nesting relationship between the sub-box and the box to which the sub-box belongs.

For example, in FIG. 2, when the type of the analyzed sub-box is the stsd box, since the stsd box is pre-marked to directly encapsulate the binary data, the stsd box is recorded in the analyzer corresponding to the stsd box, an example of the stsd box is arranged in a stbl box sub-box attribute, the rest may be deduced by analogy, and finally, a plurality of sub-boxes such as a stsd box, a stts box and a stsc box nested in a stbl box are recorded in the sub-box attribute of the stsd box.

In one embodiment, when it is determined by comparison that the box types of the sub-boxes are not pre-marked or are pre-marked to directly encapsulate the binary data, but the analyzer with the corresponding type is not called, analyzing of the binary data corresponding to the sub-boxes is ignored, and the analyzer jumps to the part corresponding to the next sub-box in the binary data for further analyzing according to the lengths of the sub-boxes.

In fact, customized box types may appear in the media file, the progress of overall analyzing of the moov box cannot be affected by adopting a jumping way, meanwhile, due to the way of arranging the analyzers, the compatible analyzing for latest moov box can be rapidly realized by increasing, deleting and modifying the analyzers with the corresponding types when the box types of the moov box are changed, so that the characteristics of flexibility and high speed in upgrading are achieved.

Step 702, media data within a given time frame is searched according to the time of the media data represented by the media information.

Figure 9:
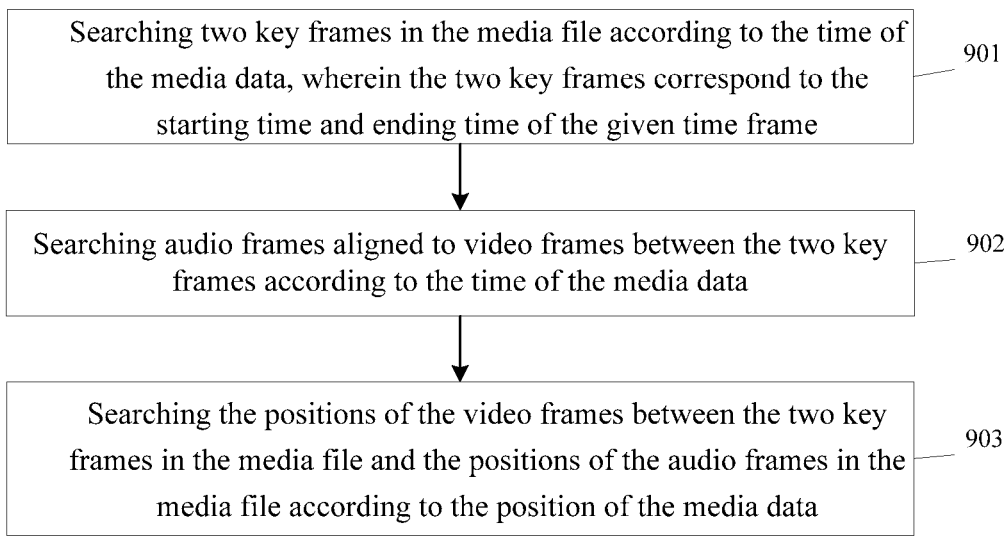
FIG. 9 is an optical flow diagram of searching media data within a given time frame from the media file in the embodiment of the disclosure.

In one embodiment of the disclosure, referring to FIG. 9, FIG. 9 is an optical flow diagram of searching media data within a given time frame from the media file in the embodiment of the disclosure and will be described in combination with steps as shown in FIG. 9.

Step 901, two key frames in the media file are searched according to the time of the media data, wherein the two key frames correspond to the starting time and ending time of the given time frame.

In one embodiment of the disclosure, when the two key frames in the media file are searched according to the time of the media data, the serial number of a first key frame of which the decoding time is aligned to the starting time of the given time frame is searched according to the time of the media data, or the serial number of a first key frame of which the decoding time is closest to the starting time in key frames of which the decoding time is prior to the starting time of the given time frame is searched; and the serial number of a second key frame of which the decoding time is aligned to the ending time of the given time frame is searched according to the time of the media data, or the serial number of a second key frame of which the decoding time is closest to the ending time in key frames of which the decoding time is posterior to the ending time of the given time frame is searched.

For example, the duration of the media file is 120 s, and a number of key frames are included; when the given time frame ranges from the $20^{th}$ second to the $40^{th}$ second, whether a key frame of which the decoding time is just at the $20^{th}$ second exists or not is firstly searched according to a mapping relationship between the decoding time of the frame and the serial number of the frame; if the key frame of which the decoding time is just at the $20^{th}$ second exists, the key frame of which the decoding time is just at the $20^{th}$ second is used as the first key frame; and if the key frame of which the decoding time is just at the $20^{th}$ second does not exist, a key frame of which the decoding time is prior to the 20th second and closest to the starting time, namely the 20th second, is used as the first key frame.

Next, whether a key frame of which the decoding time is just at the $40^{th}$ second exists or not is searched; if the key frame of which the decoding time is just at the $40^{th}$ second exists, the key frame of which the decoding time is at the $40^{th}$ second is used as a second key frame; and if the key frame of which the decoding time is just at the $40^{th}$ second does not exist, a key frame of which the decoding time is posterior to the $40^{th}$ second and closest to the $40^{th}$ second is used as the second key frame.

Due to the adoption of a way of searching the key frames in the video frames, the condition of frame skip caused by playing incapability since the frame corresponding to the starting time is a common frame can be avoided, meanwhile, the acquisition of useless data is reduced to the maximum extent, and the flow is saved during network transmission.

Step 902, audio frames aligned to video frames between the two key frames are searched according to the time of the media data.

In one embodiment, a player may search audio frames aligned to the given time frame in the time of the media data in the following way: searching audio frames of which the decoding time is distributed according to the given time frame from the time of the media data, and determining the audio frames with synchronous time in video frames based on the video frames; when corresponding audio frames exist in the time of a playing point, the decoding time of the initial audio frame is aligned to the starting time of the given time frame; when no corresponding audio frames exist in the time of the playing point, the decoding time of the initial audio frame is prior to the starting time of the given time frame and is closest to the starting time, so that it is ensured that the decoding time of the initial audio frame is not posterior to the decoding starting time of a first video frame (the above-mentioned first key frame); when the corresponding audio frames exist in the ending time of the given time frame, the decoding time of a last audio frame is aligned to the ending time of the given time frame; and when no corresponding audio frames exist in the ending time of the given time frame, the decoding time of the last audio frame is posterior to the ending time of the given time frame and is closest to the ending time, so that it is ensured that the decoding time of the last audio frame is not prior to the decoding time of a last video frame (the above-mentioned second key frame).

Due to the adoption of the above-mentioned way of searching the audio frames, the formed segmented media files including the video frames and the corresponding audio frames overcomes the problem of video and audio duration inconsistency possibly appearing, guarantees the synchronous audio playing during playing of each frame of video, and avoids the phenomenon of no sounds.

Step 903, the positions of the video frames between the two key frames in the media file and the positions of the audio frames in the media file are searched according to the position of the media data.

In one embodiment, according to step 703, the position of the media data in the media file may be represented as two intervals: a first interval, namely the positions of the video frames between the two key frames in the media file, includes the offsets and volumes in the mdat box of the media file; and a second interval, namely the position of an audio frame between two audio frames in the media file, includes offsets and volumes in the mdat box of the media file. The offsets represent the storage starting position of the media data in the mdat box of the media file, and the volumes represent lengths occupied by the media data from the storage starting position.

In the other embodiment, the position of the media data in the media file represents an interval, an interval formed by the minimum offset and the maximum volume is determined according to offsets and volumes corresponding to the positions of the video frames between the two key frames and offsets and volumes corresponding to the positions of the audio frames aligned to the video frames.

For example, an interval corresponding to the offsets of the positions of the video frames between the first key frame and the second key frame in the media file with the target resolution is [a, b] (an address is in an ascending order), an interval corresponding to the offsets of the positions of the audio frames in the media file with the target resolution is [c, d] (the address is in the ascending order), and then, an interval formed by the upper limit and the lower limit of the positions is [min(a, c), max(b, d)].

Due to the adoption of the above-mentioned way of determining an interval, the media data within the given time frame can be extracted from the media file at one time, so that the reading frequency of the player is reduced, and the processing efficiency is increased. In this way, the player sends a network request carrying the offsets and volumes of a target interval to a server so as to request media data within the target interval, and the server returns the media data within the target interval at one time after extracting the media data in the media file based on the offsets and volumes of the target interval, and secondary acquisition is not needed, so that the requesting frequency of the player is reduced, and the processing efficiency is increased.

Due to the adoption of the technical solution as shown in the embodiment, the determination of the video frames in the nested structures and the determination of the positions of the corresponding audio frames in the audio track box can be realized in combination with the structure as shown in FIG. 2.

When the given time frame of the media file is played by the player embedded in the webpage, for the segmented media files constructed based on the media data within the given time frame, it is required to acquire the positions of parts of media data in the media file, including the offsets and the volumes, so that the media data can be correctly extracted to construct the segmented media files so as to be correctly decoded.

Step 703, the position of the media data within the given time frame in the media file is searched according to the position of the media data represented by the media information in the media file.

Figure 10:
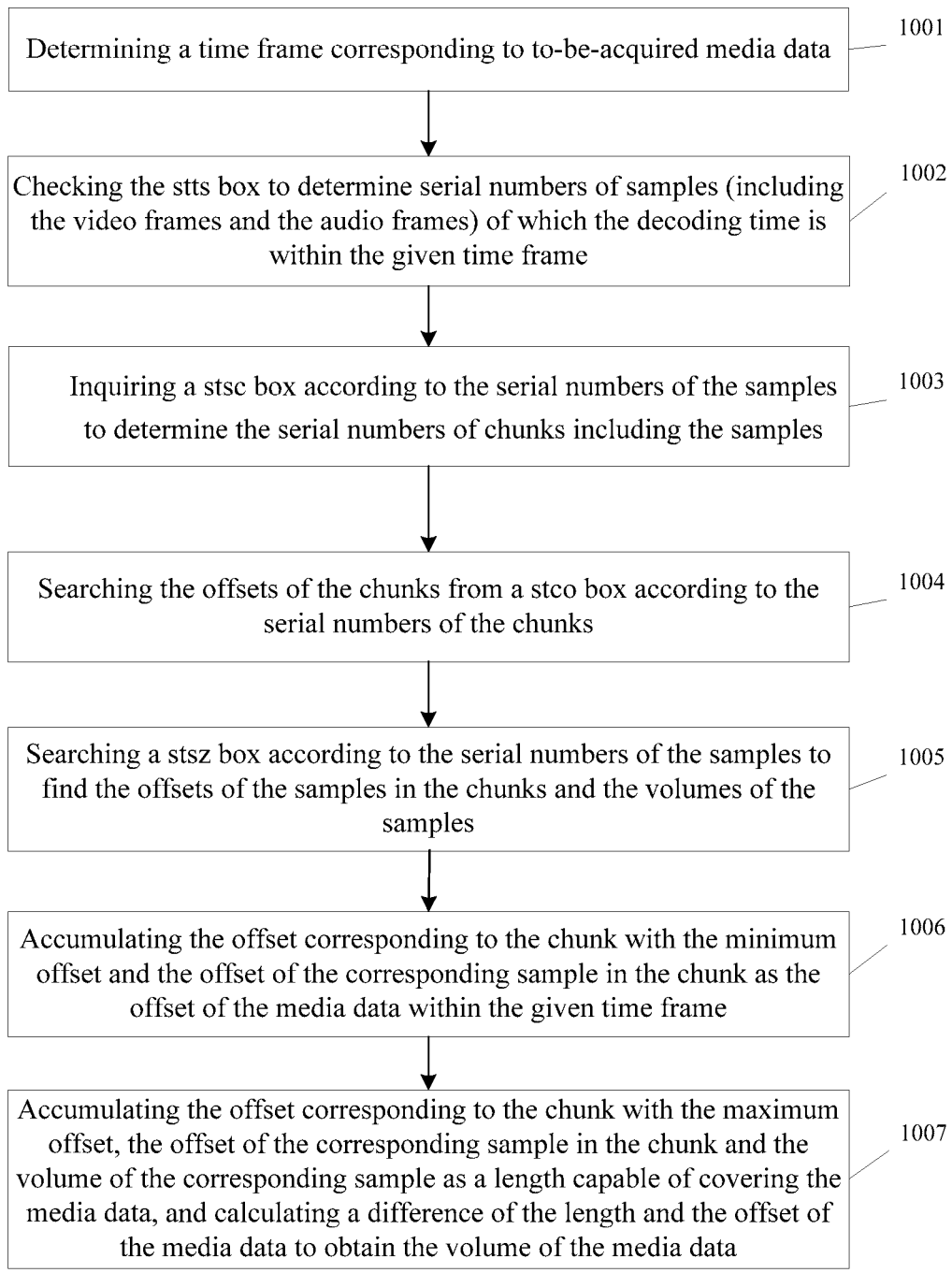
FIG. 10 is an optional flow schematic diagram of searching the position of the media data within a given time frame from the media file in the embodiment of the disclosure.

Below, with the medial file adopting an encapsulating structure as shown in FIG. 4 as an example, the step of searching the position of the media data within the given time frame in the media file from the media file is described, referring to FIG. 10, FIG. 10 is an optional flow schematic diagram of searching the position of the media data within the given time frame from the media file in the embodiment of the disclosure and will be described in combination with steps as shown in FIG. 10.

Step 1001, a time frame corresponding to to-be-acquired media data is determined.

The time frame is a period of a continuous playing point, the time corresponding to the playing point is a time dimension relative to a media time coordinate system (the time of starting to play the media file is used as a time origin), and the length of the time frame is shorter than the length of the media file, for example, the length of the time frame is 5% of the preset proportion of the length of the media file or is a preset length such as 10 mins.

Step 1002, the stts box is checked to determine serial numbers of samples (including the video frames and the audio frames) of which the decoding time is within the given time frame.

For example, for the audio frames, the stts box is checked to determine the serial number of the audio frames of which the decoding time corresponds to the given time frame; for the video frames, due to the adoption of a compression algorithm, if a first frame in the given time frame is not a key frame, it is also required to trace back to the key frame before the starting time of the given time frame according to a chronological order so as to ensure that frames within the given time frame can be decoded.

Step 1003, a stsc box is inquired according to the serial numbers of the samples to determine the serial numbers of chunks including the samples.

Step 1004, the offsets of the chunks are searched from a stco box according to the serial numbers of the chunks.

Step 1005, a stsz box is searched according to the serial numbers of the samples to find the offsets of the samples in the chunks and the volumes of the samples.

The serial numbers and volumes of the samples are recorded in the stsz box, and the offsets of the chunks and the offsets of the samples in the chunks are accumulated to obtain the offsets of the samples in a mdat box.

Step 1006, the offset corresponding to the chunk with the minimum offset and the offset of the corresponding sample in the chunk are accumulated as the offset of the media data within the given time frame.

Step 1007, the offset corresponding to the chunk with the maximum offset, the offset of the corresponding sample in the chunk and the volume of the corresponding sample are accumulated as a length capable of covering the media data, and a difference of the length and the offset of the media data is calculated to obtain the volume of the media data.

For steps 1006 and 1007, the positions (including the offsets and the volumes) of the audio frames within the given time frame and the positions (including the offsets and the volumes) of the video frames within the given time frame are calculated to respectively obtain intervals occupied when the video frames and the audio frames are stored in the mdat box.

Step 704, the media data corresponding to the position is extracted from the mdat box of the media file.

In one embodiment of the disclosure, when the position of media file data in the mdat box is represented by the two intervals recorded according to step 703, namely the position of media file data in the mdat box is respectively represented by the intervals respectively corresponding to the video frames and the audio frames, the binary data corresponding to the video frames is extracted from the mdat box according to the positions of the video frames; and the corresponding binary data is extracted from the mdat box according to the positions of the audio frames.

In one embodiment of the disclosure, when the position of the media file data in the mdat box is represented by one of the intervals recorded in the above-mentioned embodiment, the media data is extracted from the corresponding interval of the mdat box of the media file at one time, so that the processing efficiency of the media data is effectively increased, and particularly, the connection occupation and flow consumption are obviously reduced when network transmission is needed.

Due to the adoption of the technical solution as shown in the embodiment, the corresponding audio frames and video frames can be obtained by one-time extraction, so that the processing speed of the media file is increased.

Step 705, the extracted media data and the metadata for describing the media data are encapsulated according to the encapsulating structure of segmented media file to obtain a segmented media file capable of being independently decoded.

Figure 11:
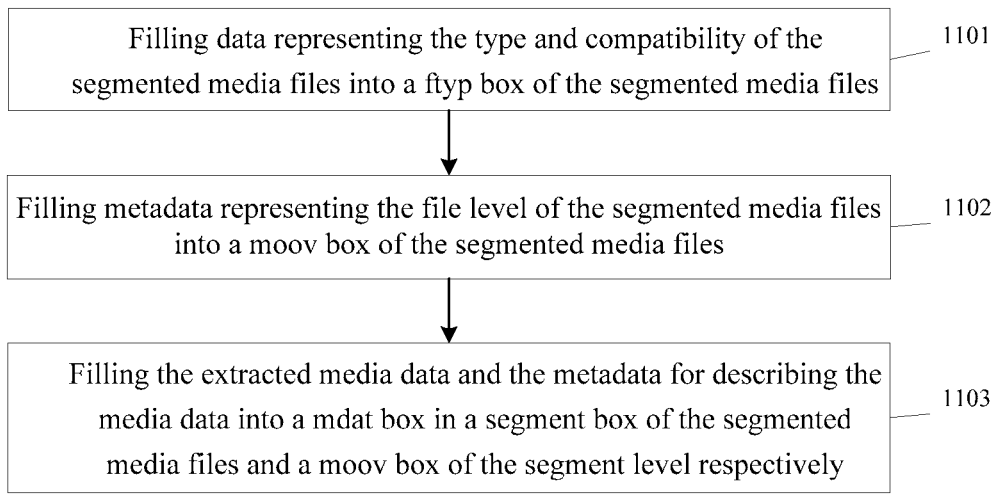
FIG. 11 is an optional flow schematic diagram of segmented media files encapsulating in the embodiment of the disclosure.

In one embodiment of the disclosure, referring to FIG. 11, FIG. 11 is an optional flow schematic diagram of segmented media files encapsulating in the embodiment of the disclosure and will be described in combination with steps as shown in FIG. 11.

Step 1101, data representing the type and compatibility of the segmented media files is filled into a ftyp box of the segmented media files.

For example, with encapsulating an FMP4 file to form an encapsulating structure as shown in FIG. 4 as an example, the header of the file type box (namely ftyp box), of the FMP4 file is filled with the type and length (representing the overall length of the ftyp box) of the box, and a data part of the ftyp box is filled with data (the binary data) generating a file type FMP4 and a compatibility protocol.

Step 1102, metadata representing the file level of the segmented media files is filled into a moov box of the segmented media files.

In one embodiment, the metadata for describing the media data, required for filling the nested structures is calculated according to the media data to be filled into the encapsulating structure of segmented media files and the nested structures of the moov boxes in the segmented media files.

Similarly, with FIG. 4 as example, the metadata representing the file level of the FMP4 file is calculated and is filled into the metadata box (namely the moov box) of FMP4, and three boxes including the mvhd box, the track box and video extension (mvex, movie extend) box are nested in the moov box.

Wherein the metadata encapsulated in the mvhd box is used for representing the media information related to the playing of the segmented media files, and the media information includes positions, durations, creation time, modification time and the like; and the sub-boxes nested in the track box represent the reference and description of corresponding tracks in the media data, for example, a box (denoted by tkhd box) for describing the characteristics and overall information (such as durations, widths and heights) of the tracks and a box (denoted by mdia box) for recording the media information (such as types of media and information of the samples) of the tracks are nested in the track box.

Step 1103, the extracted media data and the metadata for describing the media data are filled into a mdat box in a segment box of the segmented media files and a moov box of segment level.

In one embodiment, one or more segments may be encapsulated in the segmented media files, to-be-filled media data may be filled into the mdat box (namely the mdat box) of one or the segments of the segmented media files, and the moov box (denoted by moof box) of the segment level is encapsulated in each segment, wherein the filled metadata is used for describing the media data filled into the segments so that the segments can be independently decoded.

In combination with FIG. 4, with filling the to-be-filled media data into two segments of the encapsulating structure of the FMP4 file as an example, each piece of segment media data is filled; and the metadata required to be filled into the moov box (namely the moof box) of the segment levels of the corresponding segments is calculated and is correspondingly filled into the sub-boxes nested in the moof box, wherein the header of the moof box is called moof box, and the filled binary data is used for representing the type of the box being "moof box" and the length of the moof box.

In one embodiment in which the data is filled into the corresponding boxes in steps 1101-1103, when the filling operation is performed, the writing operation function of the class is called to complete the writing-in and mergence of the binary data in memory buffering zones of the sub-boxes and return an instance of the class, and the returned instance is used for merging the sub-boxes and the sub-boxes among which the nesting relationship exists.

As an example of filling the data, a class MP4 for realizing an encapsulating function and the static method for encapsulating each sub-box in the segmented media files to form a class Stream are established; classes Stream for realizing a binary data operation function are established, each class Stream is provided with a memory buffering zone for storing to-be-filled binary data; to-be-filled multibyte decimal data is converted into the binary data by using the static method provided by Stream; the mergence and filling of the binary data to be filled into the sub-boxes are completed in the memory buffering zones through the writing operation function provided by the instances of the classes Stream; and a new Stream instance is returned by using the static method provided by Stream, so that the mergence of the current sub-boxes and other sub-boxes among which the nesting relationship exists can be realized.

Figure 12:
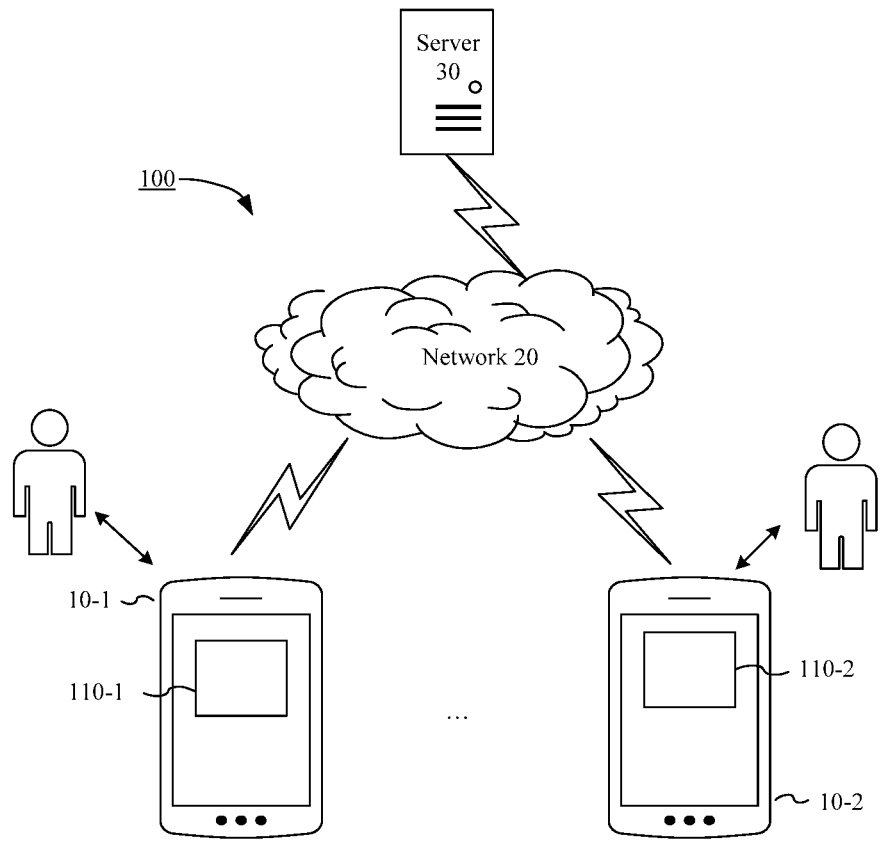
FIG. 12 is an optional usage scene schematic diagram of the conversion method for media file provided by the embodiment of the disclosure.

FIG. 12 is an optional usage scene schematic diagram of the conversion method for media file provided by the embodiment of the disclosure, referring to FIG. 12, the conversion device for media file provided by the embodiment of the disclosure can be implemented as a user end 10, in order to support one exemplary application, the user end 10 (exemplarily showing a user end 10-1 and a user end 10-2) is connected with a server 30 by a network 20, and the network 20 may be a wide area network or a local area network or a combination of the wide area network and the local area network and realizes data transmission by using a wireless link.

The user end 10 plays the media file by the webpage embedded with the player and displays the played content by virtue of a graphical interface 110 (exemplarily showing a graphical interface 110-1 and a graphical interface 110-2), the user end 10 analyzes the metadata encapsulated in the moov box of the media file and acquired from the server 30 to obtain the media information for describing the media data encapsulated in the mdat box of the media file, and the media file adopts the non-streaming media format; the media data within the given time frame is searched according to the time of the media data represented by the media information; the position of the media data within the given time frame in the media file is searched according to the position of the media data represented by the media information in the media file; the media data corresponding to the position is extracted from the mdat box of the media file; and the extracted media data and the metadata for describing the media data are encapsulated according to the encapsulating structure of segmented media files to obtain the segmented media files capable of being independently decoded.

Figure 13:
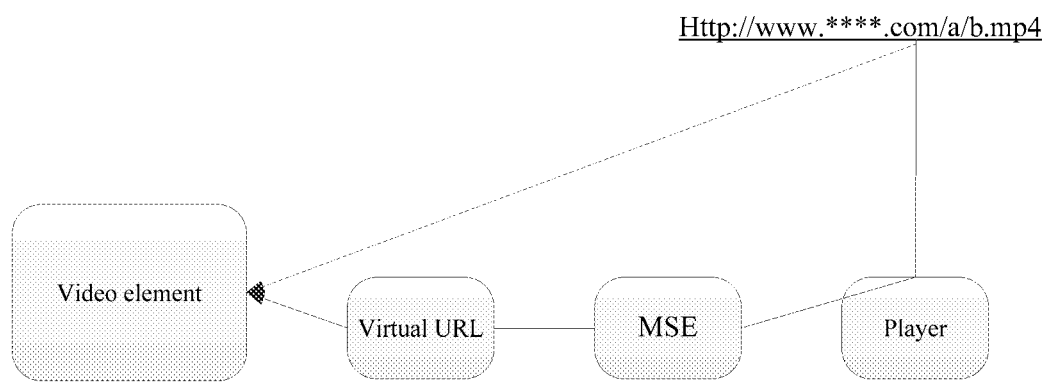
FIG. 13 is a schematic diagram that the MP4 file is converted into the FMP4 file and is played through a media source extension interface in the embodiment of the disclosure.

FIG. 13 is a schematic diagram that the MP4 file is converted into the FMP4 file and is played through a media source extension interface in the embodiment of the disclosure, referring to FIG. 13, the player acquires media data meeting a fixed duration based on a true address (http://www.toutiao.com/a/b.mp4 in the figure) of the media file, and next, constructs the segmented media files based on the acquired media data, namely the acquired media data is converted into the segmented media files in an MP4 format, and then, the segmented media files is added into media source objects (realized by adopting a class file object (Blob) way, for example) of an MSE, and the MSE creates virtual URLs corresponding to the media source objects and transfers the virtual URLs to Video elements so that the Video elements acquire the corresponding media source objects, and furthermore, the extracted media data and the metadata for describing the media data are encapsulated according to the encapsulating structure of segmented media files to obtain the segmented media files capable of being independently decoded.

According to the conversion method for media file provided by the disclosure, the metadata encapsulated in the moov box of the media file is analyzed to obtain the media information for describing the media data encapsulated in the mdat box of the media file, and the media data within the given time frame is searched according to the time of the media data represented by the media information; the position of the media data within the given time frame in the media file is searched according to the position of the media data represented by the media information in the media file; the media data corresponding to the position is extracted from the mdat box of the media file; and the extracted media data and the metadata for describing the media data are encapsulated according to the encapsulating structure of segmented media files to obtain the segmented media files capable of being independently decoded. In this way, the media data within any given time frame may be extracted from the media file to construct the segmented media files, then, the media data within the given time frame is only needed to be extracted from the media file with the non-streaming media format and is encapsulated into the segmented media files capable of being independently decoded when the media data within the given time frame in the media file is needed to be played, and therefore, the restriction that a file with the non-streaming media format can be independently played only after being completely downloaded is overcome, and the playing real-time property is good; and meanwhile, it is only required to construct the segmented media files for the given time frame, rather than to convert the integrated media file into the stream media format in advance, the conversion delay is little, and therefore, pre-storage is not needed; and the additional storage space cannot be occupied except an original media file, so that the occupation of the storage space is remarkably reduced.

The above mentioned is only intended to describe preferred embodiments of the disclosure, rather than to limit the protective scope of the disclosure, and any modifications, equivalent replacements, improvements and the like made within the spirit and principle of the disclosure should fall within the protective scope of the disclosure.

The invention claimed is:

1. A method, comprising:
analyzing metadata encapsulated in a moov box of a media file to obtain media information for describing media data encapsulated in a mdat box of the media file, wherein the media file is expressed in non-streaming media format;
searching media data within a given time frame according to the time of the media data represented by the media information;
searching the position of the media data within the given time frame in the media file according to the position of the media data represented by the media information in the media file;
extracting the media data corresponding to the position from the mdat box of the media file; and
encapsulating the extracted media data and the metadata for describing the media data according to the encapsulating structure of segmented media file to obtain the segmented media file capable of being independently decoded, wherein the encapsulating the extracted media data and the metadata for describing the media data according to the encapsulating structure of segmented media file further comprises:
calling a writing operation function of a class to complete writing-in and mergence of binary media data in memory buffering zones of sub-boxes of the segmented media file, and
merging the sub-boxes with other sub-boxes, wherein a nesting relationship exists between the sub-boxes and the other sub-boxes.

2. The method according to claim 1, wherein the searching media data within a given time frame according to the time of the media data represented by the media information comprises:
searching two key frames in the media file according to the time of the media data, wherein the two key frames correspond to the starting time and ending time of the given time frame;
searching audio frames aligned to video frames between the two key frames according to the time of the media data; and
searching the positions of the video frames between the two key frames in the media file and the positions of the audio frames in the media file according to the position of the media data.

3. The method according to claim 2, wherein the searching two key frames in the media file according to the time of the media data comprises:
searching a first key frame of which the decoding time is aligned to the starting time of the given time frame according to the time of the media data, or searching key frames of which the decoding time is prior to the starting time of the given time frame, and searching a first key frame of which the decoding time is closest to the starting time from the found key frames;
searching a second key frame of which the decoding time is aligned to the ending time of the given time frame according to the time of the media data, or searching key frames of which the decoding time is posterior to the ending time of the given time frame, and searching a second key frame of which the decoding time is closest to the ending time from the found key frames.

4. The method according to claim 3, wherein the searching audio frames aligned to video frames between the two key frames according to the time of the media data comprises:
searching the audio frames of which the decoding time is within the given time frame according to the time of the media data;
wherein the decoding time of the initial audio frame is aligned to the starting time of the given time frame or is prior and closest to the starting time of the given time frame; and
wherein the decoding time of a last audio frame is aligned to the ending time of the given time frame or is posterior and closest to the ending time of the given time frame.

5. The method according to claim 1, wherein the analyzing metadata encapsulated in a moov box of a media file to obtain media information for describing media data encapsulated in a mdat box of the media file comprises:
analyzing nested structures of sub-boxes in the moov box, and reading binary data in each sub-box according to the nested structures; and
analyzing the media information of the media data represented by each sub-box from the read binary data.

6. The method according to claim 1, wherein the extracting the media data corresponding to the position from the mdat box of the media file comprises:
determining an interval formed by the minimum offset and the maximum volume according to offsets and volumes corresponding to the positions of the video frames between the two key frames and offsets and volumes corresponding to the positions of the audio frames aligned to the video frames; and
extracting the media data within the given time frame from the corresponding interval of the mdat box of the media file.

7. The method according to claim 6, wherein the offsets represent the storage starting position of the media data in the mdat box of the media file, and the volumes represent lengths of the media data started from the storage starting position.

8. The method according to claim 1, wherein the encapsulating the extracted media data and the metadata for describing the media data according to the encapsulating structure of segmented media file comprises:
filling data representing the type and compatibility of the segmented media files into a ftyp box of the segmented media files;
filling metadata representing the file level of the segmented media files into a moov box of the segmented media files; and
filling the extracted media data and the metadata for describing the media data into a mdat box in a segment box of the segmented media files and a moov box of segment level respectively.

9. A device, comprising:
at least one processor; and
at least one memory communicatively coupled to the at least one processor and storing instructions that upon execution by the at least one processor cause the device to:
analyze metadata encapsulated in a moov box of a media file to obtain media information for describing media data encapsulated in a mdat box of the media file, wherein the media file is expressed in non-streaming media format;
search media data within a given time frame according to the time of the media data represented by the media information, and search the position of the media data within the given time frame in the media file according to the position of the media data represented by the media information in the media file;
extract the media data corresponding to the position from the mdat box of the media file; and
encapsulate the extracted media data and the metadata for describing the media data according to the encapsulating structure of segmented media file to obtain a segmented media file capable of being independently decoded, wherein the at least one memory further stores instructions that upon execution by the at least one processor cause the device to:
call a writing operation function of a class to complete writing-in and mergence of binary media data in memory buffering zones of sub-boxes of the segmented media file, and
merge the sub-boxes with other sub-boxes, wherein a nesting relationship exists between the sub-boxes and the other sub-boxes.

10. The device according to claim 9, wherein the at least one memory further stores instructions that upon execution by the at least one processor cause the device to:
search two key frames in the media file according to the time of the media data, wherein the two key frames correspond to the starting time and ending time of the given time frame;
search audio frames aligned to video frames between the two key frames according to the time of the media data; and
search the positions of the video frames between the two key frames in the media file and the positions of the audio frames in the media file according to the position of the media data.

11. The device according to claim 10, wherein the at least one memory further stores instructions that upon execution by the at least one processor cause the device to:
search a first key frame of which the decoding time is aligned to the starting time of the given time frame according to the time of the media data;
search key frames of which the decoding time is prior to the starting time of the given time frame and search a first key frame of which the decoding time is closest to the starting time from the found key frames;
search a second key frame of which the decoding time is aligned to the ending time of the given time frame according to the time of the media data; and
search key frames of which the decoding time is posterior to the ending time of the given time frame and search a second key frame of which the decoding time is closest to the ending time from the found key frames.

12. The device according to claim 11, wherein the at least one memory further stores instructions that upon execution by the at least one processor cause the device to:
search the audio frames of which the decoding time is within the given time frame according to the time of the media data;
wherein the decoding time of the initial audio frame is aligned to the starting time of the given time frame or is prior and closest to the starting time of the given time frame; and
wherein the decoding time of a last audio frame is aligned to the ending time of the given time frame or is posterior and closest to the ending time of the given time frame.

13. The device according to claim 9, wherein the at least one memory further stores instructions that upon execution by the at least one processor cause the device to:
analyze nested structures of sub-boxes in the moov box and read binary data in each sub-box according to the nested structures; and
analyze the media information of the media data represented by each sub-box from the read binary data.

14. The device according to claim 9, wherein the at least one memory further stores instructions that upon execution by the at least one processor cause the device to:
determine an interval formed by the minimum offset and the maximum volume according to offsets and volumes corresponding to the positions of the video frames between the two key frames and offsets and volumes corresponding to the positions of the audio frames aligned to the video frames; and
extract the media data within the given time frame from the corresponding interval of the mdat box of the media file.

15. The device according to claim 14, wherein the offsets represent the storage starting position of the media data in the mdat box of the media file, and the volumes represent lengths of the media data started from the storage starting position.

16. The device according to claim 9, wherein the at least one memory further stores instructions that upon execution by the at least one processor cause the device to:
perform filling operation on data representing the type and compatibility of the segmented media files so as to fill the data into a ftyp box of the segmented media files;
fill metadata representing the file level of the segmented media files into a moov box of the segmented media files; and
correspondingly fill the extracted media data and the metadata for describing the media data into a mdat box in a segment box of the segmented media files and a moov box of segment level.

17. A non-transitory storage medium, storing executable instructions and being configured to perform operations when the executable instructions are executed, the operations comprising:
analyzing metadata encapsulated in a moov box of a media file to obtain media information for describing media data encapsulated in a mdat box of the media file, wherein the media file is expressed in non-streaming media format;

searching media data within a given time frame according to the time of the media data represented by the media information;

searching the position of the media data within the given time frame in the media file according to the position of the media data represented by the media information in the media file;

extracting the media data corresponding to the position from the mdat box of the media file; and encapsulating the extracted media data and the metadata for describing the media data according to the encapsulating structure of segmented media file to obtain the segmented media file capable of being independently decoded, wherein the encapsulating the extracted media data and the metadata for describing the media data according to the encapsulating structure of segmented media file further comprises:

calling a writing operation function of a class to complete writing-in and mergence of binary media data in memory buffering zones of sub-boxes of the segmented media file, and merging the sub-boxes with other sub-boxes, wherein a nesting relationship exists between the sub-boxes and the other sub-boxes.

18. The non-transitory storage medium of claim 17, the operations further comprising:

searching two key frames in the media file according to the time of the media data, wherein the two key frames correspond to the starting time and ending time of the given time frame;

searching audio frames aligned to video frames between the two key frames according to the time of the media data; and searching the positions of the video frames between the two key frames in the media file and the positions of the audio frames in the media file according to the position of the media data.

19. The non-transitory storage medium of claim 17, the operations further comprising:

analyzing nested structures of sub-boxes in the moov box, and reading binary data in each sub-box according to the nested structures; and analyzing the media information of the media data represented by each sub-box from the read binary data.

20. The non-transitory storage medium of claim 17, the operations further comprising:

filling data representing the type and compatibility of the segmented media files into a ftyp box of the segmented media files;

filling metadata representing the file level of the segmented media files into a moov box of the segmented media files; and filling the extracted media data and the metadata for describing the media data into a mdat box in a segment box of the segmented media files and a moov box of segment level respectively.

* * * * *